(12) United States Patent
Luu et al.

(10) Patent No.: US 7,682,653 B1
(45) Date of Patent: Mar. 23, 2010

(54) MAGNETIC DISK WITH UNIFORM LUBRICANT THICKNESS DISTRIBUTION

(75) Inventors: Thuan Luu, San Jose, CA (US); Walter Crofton, Castro Valley, CA (US); Bill Liu, Pleasanten, CA (US); David Spaulding, San Jose, CA (US); Kwang Kon Kim, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1051 days.

(21) Appl. No.: 11/155,343

(22) Filed: Jun. 17, 2005

Related U.S. Application Data (60) Provisional application No. 60/580,439, filed on Jun. 17, 2004.

(51) Int. Cl.
*B05D 5/12* (2006.01)
(52) U.S. Cl. .......................... 427/127; 427/130
(58) Field of Classification Search ............ 427/127, 427/130
See application file for complete search history.

(56) References Cited

U.S. PATENT DOCUMENTS

| | | | |
|---|---|---|---|
| 4,573,851 A | 3/1986 | Butler |
| 4,676,008 A | 6/1987 | Armstrong |
| 4,694,778 A | 9/1987 | Learn et al. |
| 4,695,217 A | 9/1987 | Lau |
| 4,789,913 A | 12/1988 | Gregory et al. |
| 4,819,579 A | 4/1989 | Jenkins |
| 4,840,530 A | 6/1989 | Nguyen |
| 4,856,957 A | 8/1989 | Lau et al. |
| 4,947,624 A | 8/1990 | Cones, Sr. et al. |
| 4,947,784 A | 8/1990 | Nishi |
| 4,958,982 A | 9/1990 | Champet et al. |
| 4,981,222 A | 1/1991 | Lee |
| 4,987,407 A | 1/1991 | Lee |
| 5,007,788 A | 4/1991 | Asano et al. |
| 5,111,936 A | 5/1992 | Kos |
| 5,125,784 A | 6/1992 | Asano |
| 5,188,499 A | 2/1993 | Tarng et al. |
| 5,314,107 A | 5/1994 | D'Aragona et al. |
| 5,430,992 A | 7/1995 | Olson |
| 5,486,134 A | 1/1996 | Jones et al. |
| 5,562,965 A | 10/1996 | Gui et al. |
| 5,620,295 A | 4/1997 | Nishi |
| 5,820,449 A | 10/1998 | Clover |
| 5,906,469 A | 5/1999 | Oka et al. |
| 5,976,255 A | 11/1999 | Takaki et al. |
| 6,031,685 A | 2/2000 | French et al. |
| 6,033,522 A | 3/2000 | Iwata et al. |
| 6,107,599 A | 8/2000 | Baumgart et al. |

(Continued)

FOREIGN PATENT DOCUMENTS

EP    0 192 244 B1    6/1990

(Continued)

OTHER PUBLICATIONS

English equivalent abstract for JP357094930A, 1982, Japio.*

(Continued)

*Primary Examiner*—Timothy H Meeks
*Assistant Examiner*—Mandy Louie (57) ABSTRACT

A method for manufacturing a magnetic disk is provided that includes the steps:
(a) forming a layer 128 of a lubricant material on a surface of a magnetic storage medium 300, the layer 128 of lubricant material also being located on an interior and/or exterior edge of the medium 300; and
(b) removing at least some of the lubricant material from the edge 160 of the medium.

36 Claims, 9 Drawing Sheets

U.S. PATENT DOCUMENTS

| | | | |
|---|---|---|---|
| 6,183,831 B1 | 2/2001 | Hughes et al. |
| 6,214,410 B1 | 4/2001 | Stirniman et al. |
| 6,345,947 B1 | 2/2002 | Egashira |
| 6,354,794 B2 | 3/2002 | Sato et al. |
| 6,355,300 B1 | 3/2002 | Stirniman et al. |
| 6,368,040 B1 | 4/2002 | Yamasaki et al. |
| 6,457,929 B2 | 10/2002 | Sato et al. |
| 6,511,702 B1 | 1/2003 | Stirniman et al. |
| 6,517,691 B1 | 2/2003 | Bluck et al. |
| 6,582,279 B1 | 6/2003 | Fox et al. |
| 6,596,083 B2 | 7/2003 | Cromwell et al. |
| 6,612,801 B1 | 9/2003 | Koguchi |
| 6,613,151 B1 | 9/2003 | Stirniman et al. |
| 6,626,744 B1 | 9/2003 | White et al. |
| 6,664,503 B1 | 12/2003 | Hsieh et al. |
| 6,808,741 B1 | 10/2004 | McLeod |
| 6,818,331 B2 | 11/2004 | Sakawaki et al. |
| 6,919,001 B2 | 7/2005 | Fairbairn et al. |
| 6,926,977 B2 | 8/2005 | Osawa et al. |
| 6,942,933 B2 | 9/2005 | Osawa |
| 7,146,710 B2 | 12/2006 | Fong et al. |
| 7,361,380 B1 | 4/2008 | Liu et al. |
| 2002/0054976 A1 | 5/2002 | Nakamura et al. |
| 2002/0132043 A1 | 9/2002 | Cromwell et al. |
| 2003/0082407 A1 | 5/2003 | Sakawaki et al. |
| 2003/0104253 A1 | 6/2003 | Osawa et al. |
| 2003/0208899 A1 | 11/2003 | Grow et al. |
| 2003/0209389 A1 | 11/2003 | Buitron et al. |
| 2003/0209421 A1 | 11/2003 | Buitron et al. |
| 2003/0210498 A1 | 11/2003 | Kim et al. |
| 2003/0211275 A1 | 11/2003 | Buitron et al. |
| 2003/0211361 A1 | 11/2003 | Kim et al. |
| 2004/0005481 A1 | 1/2004 | Osawa |
| 2004/0013011 A1 | 1/2004 | Valeri |
| 2004/0016214 A1 | 1/2004 | Buitron |
| 2004/0023074 A1 | 2/2004 | Shimizu et al. |
| 2004/0035737 A1 | 2/2004 | Buitron et al. |
| 2004/0037005 A1 | 2/2004 | Osawa |
| 2004/0068862 A1 | 4/2004 | Buitron et al. |
| 2004/0069662 A1 | 4/2004 | Buitron et al. |
| 2004/0070092 A1 | 4/2004 | Buitron et al. |
| 2004/0070859 A1 | 4/2004 | Crofton et al. |
| 2004/0071535 A1 | 4/2004 | Crofton et al. |
| 2004/0170870 A1 | 9/2004 | Yokoyama et al. |
| 2005/0003106 A1 | 1/2005 | Isozaki |
| 2005/0037140 A1 | 2/2005 | Sakawaki et al. |
| 2005/0060305 A1 | 3/2005 | Hopkins et al. |
| 2005/0074635 A1 | 4/2005 | Mitani et al. |
| 2005/0132958 A1 | 6/2005 | Leng et al. |

FOREIGN PATENT DOCUMENTS

| | | | |
|---|---|---|---|
| EP | 0 177 073 B1 | | 9/1990 |
| EP | 0 768 704 A2 | | 4/1997 |
| JP | 357094930 A | * | 6/1982 |
| JP | 07-263521 | | 10/1995 |
| JP | 08273210 | | 10/1996 |
| JP | 2001232667 | | 8/2001 |

OTHER PUBLICATIONS

Jim Eckerman et al., "The Dynamics of Surface Curvature and the Head-to-Disk Interface," May 2004 Insight, 8 pages.

Tom Coughlin, "Review of the IDEMA Perpendicular Recording Symposium," Coughlin Associates (2004), 10 pages.

D.J. Perettie et al., "Advanced Lubrication Technology for X-1P Interaction with Media Carbon and Z-Type Lubricants," *Tribology Letters*, vol. 14, No. 2 (Feb. 2003), pp. 77-82.

Ronald D. Weiss, "Environmental Stability Study and Life Expectancies of Magnetic Media for Use with IBM 3590 and Quantum Digital Linear Tape Systems," Arkival Technology Corporation, NAMA-01-F-0061 (Oct. 2001-Jun. 2002), pp. 1-94.

* cited by examiner

MAGNETIC DISK WITH UNIFORM LUBRICANT THICKNESS DISTRIBUTION

CROSS REFERENCE TO RELATED APPLICATION

The present application claims the benefits, under 35 U.S.C. §119(e), of U.S. Provisional Application Ser. No. 60/580,439, filed Jun. 17, 2004, entitled "Magnetic Disks with Uniform Lubricant Thickness Distribution at the Outer Edge and Chamfer", which is incorporated herein by this reference.

FIELD

The invention relates generally to information storage media and particularly to magnetic storage media.

BACKGROUND

Track densities continue to increase to meet the demand for storage capacity in the smallest possible space. The demand for increased areal density and ever larger disk storage capacities requires a lower flying height (or lower Head Media Spacing or HMS) of the read/write head above the disk surface. Lower clearances equate to higher track densities and higher bit rates.

Disk surface morphology can have a substantial impact on read/write head performance and therefore areal density. Substantial fluctuations in surface curvature, whether circumferential or tangential curvature or radial curvature, can cause fly height modulation as the head moves over the disk surface. Magnetic flux density in the air gap changes by the cube of the distance. Fly height modulation during the write cycle can decrease the flux density to a level where the flux density is not sufficient to saturate the media. Moreover, fly height modulation during the read cycle can decrease the flux density to a level where data cannot be read accurately. As a consequence, the flatness, waviness, and roughness features on the disk surface may be the next practical barrier to increasing storage capacity.

Current disk manufacturing processes attempt to manufacture disks having only small fluctuations in surface and radial curvatures. In a typical manufacturing process, the disk is ground, polished, washed, rinsed, and tape burnished and wiped. In tape burnishing and wiping, the disk is polished while it spins around a spindle. After buffing and burnishing, the substrate is wiped and a clean lube is evenly applied on the surface. The lube is commonly applied by a dip lubrication process in which the disks are dipped or immersed in a bath of the lubricant. The disks may then be removed from and suspended above the bath to permit the excess lubricant to drip into the bath and the lubricant to dry. Alternatively, the bath vessel may be drained of the lubricant while the positions of the disks are maintained in the vessel. In either event, the disk is removed slowly from the lubricant bath so that, under the force of gravity, only a thin film of lubricant forms on the disk surface.

The disk is prepared and tested for quality through a three-stage process. First, a burnishing head passes over the surface, removing any bumps (known as asperites) and increasing the bond strength between the lubricant layer and underlying protective layer. The glide head then passes over the disk, checking for any remaining asperites. Finally, the certifying head checks the surface for manufacturing defects and measures the magnetic recording ability of the substrate.

Notwithstanding the foregoing process, there have still been problems with flying height modulations.

SUMMARY

These and other needs are addressed by the various embodiments and configurations of the present invention. The present invention is directed generally to removing and/or redistributing an unevenly or nonuniformnly distributed selected material on a surface of a disk.

In a first embodiment, a manufacturing process is provided that includes the steps:

(a) providing a magnetic storage medium (e.g., a disk), the medium including a layer of a first material, the first material being located on an interior and/or exterior edge of the medium; and (b) removing at least some of the first material from the edge of the medium.

The first material may be removed completely from the medium and/or redistributed to other parts of the medium.

The first material is commonly lubricant that has been deposited by dip lubrication techniques. The layer of the lubricant material is substantially continuously distributed over the surface area of the medium.

The first material is typically removed by a continuous or discontinuous length of wiping material, such as a cloth (which may be woven or unwoven), tape, paper, and the like. The wiping material may or may not include an abrasive material.

A contact assembly may apply pressure to the wiping material to make the removal and/or redistribution of the first material more effective. In one configuration, the medium is rotated while in contact with the wiping material, and the wiping material is moved across the medium's edge in a direction parallel to the edge of the disk and along the arcuate chamfer of the medium. The disk rotation and wiping material movement provide enhanced removal and/or redistribution of the first material.

The process of the present invention can provide, even over long time periods, a disk having a disk surface morphology that provides a high level of read/write head performance and therefore enables the use of a high areal density. The more uniformly deposited lubricant layer can provide a more uniform surface curvature, whether circumferential or tangential curvature or radial curvature, and inhibit fly height modulation as the head moves over the disk surface.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

Figure 1:
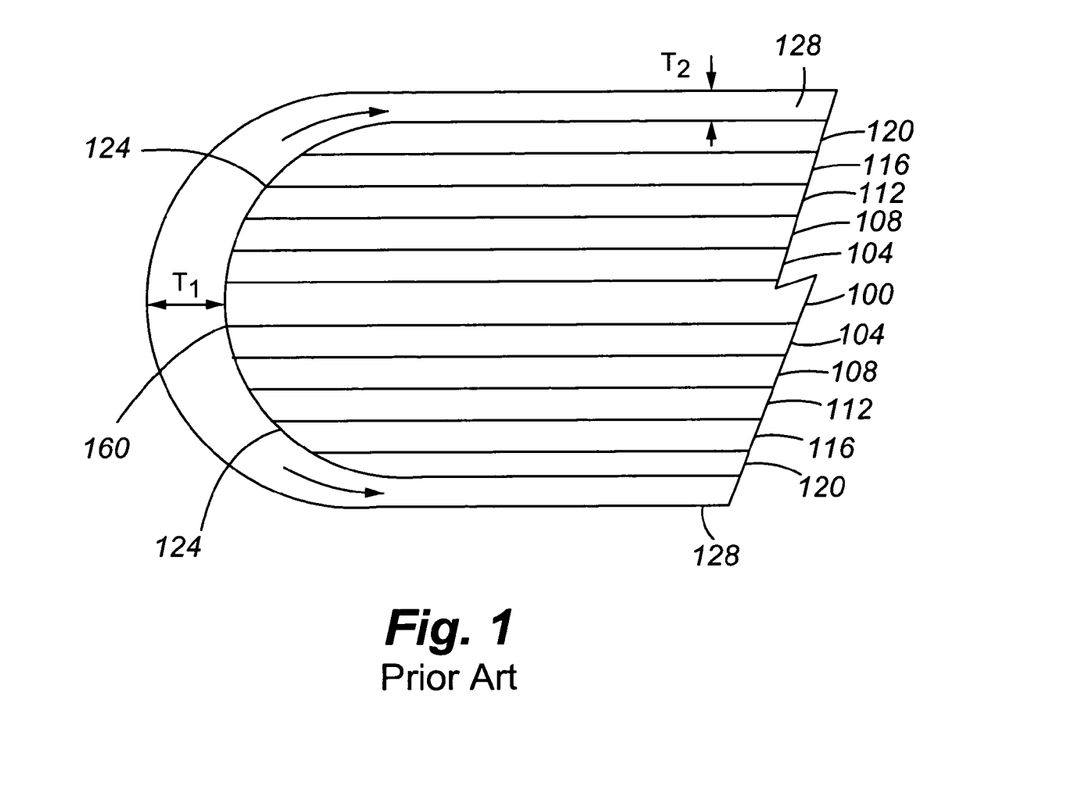
FIG. 1 is a cross-sectional view of a conventional disk after the dip lubrication and conventional burnishing processes.
Figure 2:
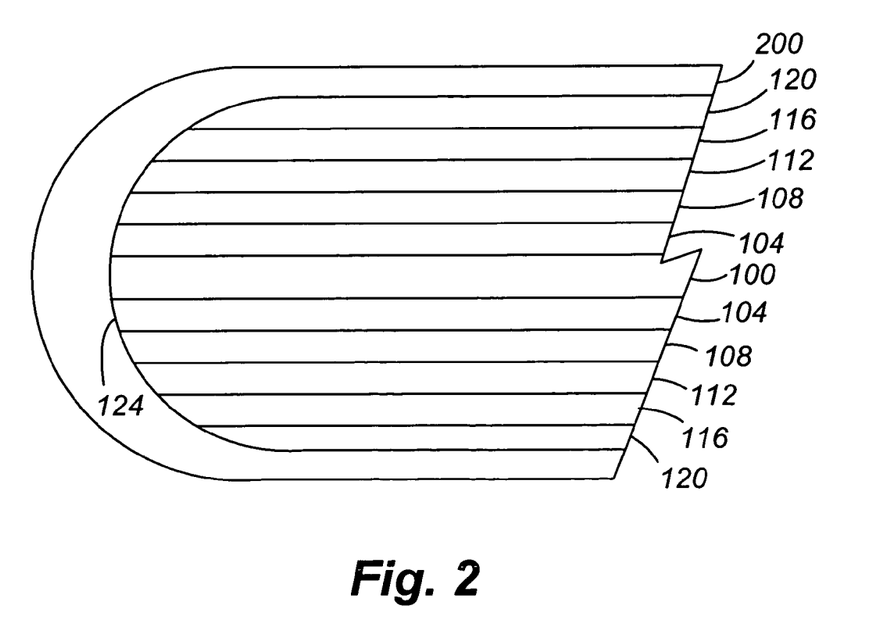
FIG. 2 is a cross-sectional view of a disk according to a process embodiment of the present invention.

The present invention is directed to providing a high degree of flatness of a magnetic disk by controlling the thickness of the lubricant layer(s). While not wishing to be bound by any theory, it is believed that a substantial contributor to fly height modulations in current disk designs is an unevenly distributed lubricant layer. Due to the intrinsic nature of the dip lubrication process widely used in thin film media manufacturing, the top and bottom of the disk outer surface contain a significantly thicker lubricant layer, which acts as a "lubricant reservoir" to provide a source of non-uniformity on the disk surface. With reference to FIG. 1, a cross-sectional view of the outer diameter edge of a disk is presented. The substrate 100 supports various layers, namely the nickel phosphorus layer 104, the underlayer 108, the magnetic layer 112, the barrier layer 116, and protective layer 120. An arcuate or angled chamfer 124 is on the edge of the disk to prevent damage to the disk during handling. A lubricant layer 128 is shown deposited over the various layers. The lubricant layer 128 has a variable thickness, ranging from about 5-25 Å and even more typically about 10-15 Å (shown as $T_2$) in the central, or information-containing, area of the disk to about 25-100 Å, more typically about 40-80 Å and even more typically about 40-60 Å (shown as $T_1$) on the outer diameter edge 160 of the disk. After dip lubrication as a result of the vertical orientation of the disk during lubricant deposition, the lubricant layer thickness on the bottom edge of the disk will typically be greater than (typically at least about 20 Å and even more typically at least about 40 Å greater than) the lubricant layer thickness on the top edge of the disk. Although the central area or data zone of the disk has a relatively uniform lubricant layer thickness due to tape burnishing and wiping, the thicker portion of the lubricant layer at the outer diameter of the disk (referred to herein as the lubricant reservoir) typically flattens out over time, due to the effects of gravity and heating on the free lubricant flow during disk operation, and thereby migrates from the edge 160 to the chamfer 124 and finally towards the disk interior or data zone, creating thick lubricant "puddles" on the upper and lower surfaces of the disk. As a result of migration, the thickness $T_1$ decreases while the thickness $T_2$ increases.

The increase in thickness $T_2$ and consequent substantial variation in the thickness of the layer 128 in the data zone can significantly degrade the mechanical and tribological performance of the disk. Areas with thicker lubricant can significantly degrade head flying characteristics and induce head degradation. As the head passes over the areas of the disk having a greater lubricant layer thickness, fly height modulations will frequently occur, potentially causing read/write errors. As discussed below, the present invention removes and/or redistributes the lubricant from the lube reservoir formed on the disk edge 160 and produces disks with a more uniform edge lubricant thickness distribution and improved long-term head flyability. Preferably, the thickness of the lubricant layer on the edge 160 is reduced by wiping or burnishing the edge of the disk, commonly with a force applied to the wiping/burnishing material.

In a typical magnetic disk, such as that shown in FIG. 1, the substrate 100 is aluminum, glass, a ceramic material, carbon, graphite, titanium, and/or plastic; the nickel phosphorus layer 104 preferably includes from about 85 to about 95 atomic % nickel and from about 5 to about 15 atomic % phosphorus; the underlayer(s) 108 is preferably chromium-based; the magnetic layer(s) 112 preferably includes from about 60 to about 80 atomic % cobalt, from about 10 to about 25 atomic % chromium, from about 0.5 to about 5 atomic % tantalum, from about 10 to about 15 atomic % platinum, and from about 5 to about 20 atomic % boron; the protective layer 120 is preferably carbon; and the lubricant layer 128 is preferably a perfluoropolymer such as Am2001™ manufactured by Montedison Company. The various layers beneath the lubricant layer are commonly deposited by sputtering techniques. Although a two-sided disk is depicted in the drawings, it is to be understood that the principles of the present invention apply equally to single-sided disks. It is further to be understood that the principles also apply to other disk configurations, such as disks having multiple coupled layers.

Figure 3:
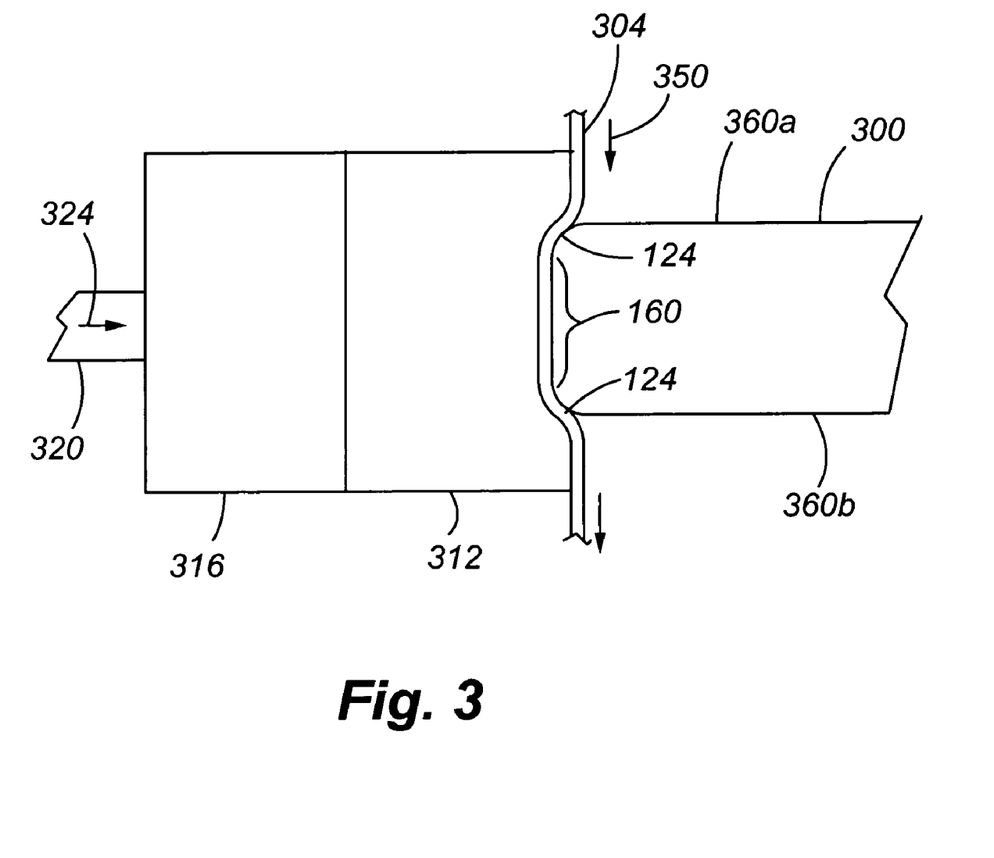
FIG. 3 is a side view of an edge wiping process according to an embodiment of the present invention.
Figure 4:
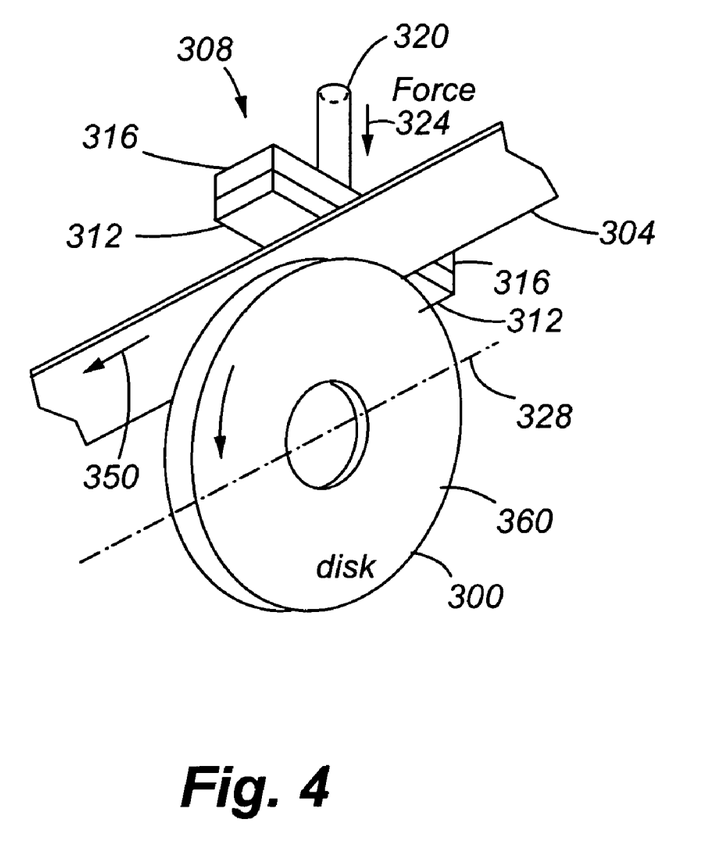
FIG. 4 is a perspective view of an edge wiping machine according to an embodiment of the present invention.

In a preferred process configuration, a lubricant removal material is contacted with the edge and chamfer 124 of the disk after lubricant layer deposition to remove at least most (and typically from about 50% to about 80%) of the lubricant in the lubricant reservoir at the disk edge and produces a maximum to minimum edge lubricant layer thickness variation of less than about 10 Å. This configuration is depicted in FIGS. 3-4. After lubricant layer deposition, the disk 300 (which has the same appearance as the disk of FIG. 1) is contacted with a lubricant removal material 304 under pressure by the contact assembly 308. The contact assembly 308 includes a contact pad 312, which has a degree of elasticity and resilience and conforms to the contour of the chamfer 124, and a pad backing material 316, which is rigid or semi-rigid. The contact assembly 308 is in contact with a cylinder piston 320 which provides force and therefore pressure in the direction 324 (which is substantially orthogonal to a latitudinal axis of symmetry 328 passing through the disk center and substantially parallel to the plane of the disk surface). The pressure applied to the disk edge during wiping is commonly varied between about 5 to about 100 psi.

Preferably, the contact pad 312 is a deformable material having a hardness ranging from about 20 to about 50 durometer to deform and conform to the arcuate or angled surface of the chamfer 124. Examples of suitable materials for the pad include polymeric materials, such as synthetic rubber, nitrile polymers, and polyurethane.

The pad backing material 316 is a rigid or semi-rigid material, such as a metal and plastic.

The lubricant removal material 304 can be any material capable of removing the lubricant material from the disk chamfer, including a cloth, tape, a pad, paper, a scrubber, and the like. The material may or may not include an abrasive material. Preferably, the material includes an abrasive material, such as alumina, typically having a size of no more than about 0.5 microns.

In operation, the disk is spun on a hub before and during contact with the lubricant removal material 304. The preferred spin rate preferably ranges from about 500 to about 5,000 rpm. The time of contact of the material 304 with the disk edge preferably ranges from about 0.25 to about 5 seconds. The number of disk rotations during this time period typically ranges from about 20 to about 200 revolutions. Simultaneously with the contact of the rotating disk 300 with the lubricant removal material 304, the lubricant removal material 304 is moved in direction 350 relative to the disk (or in a direction substantially orthogonal to the plane of the disk surface 360 and substantially parallel to the latitudinal axis 328) and forced against the disk edge 160. As shown in FIG. 4, the force causes the contact pad 312 to conform to the contour of the disk edge 160 and chamfer 124, thereby causing the lubricant removal material 304 also to conform to the disk edge and chamfer contour. The combined effects of the disk rotational and lubricant removal material motion are effective in removing excess lubricant material from the disk edge 160 and chamfer 124.

Figure 5:
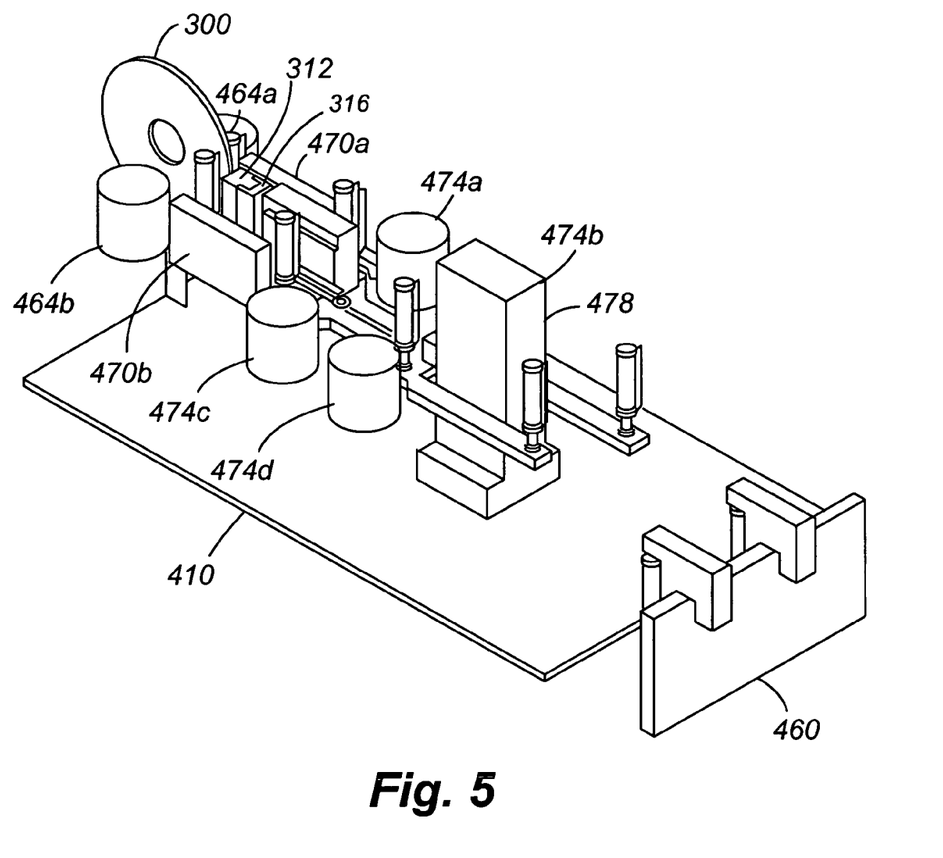
FIG. 5 is a perspective view of an edge wiping and burnishing machine according to an embodiment of the present invention.
Figure 6:
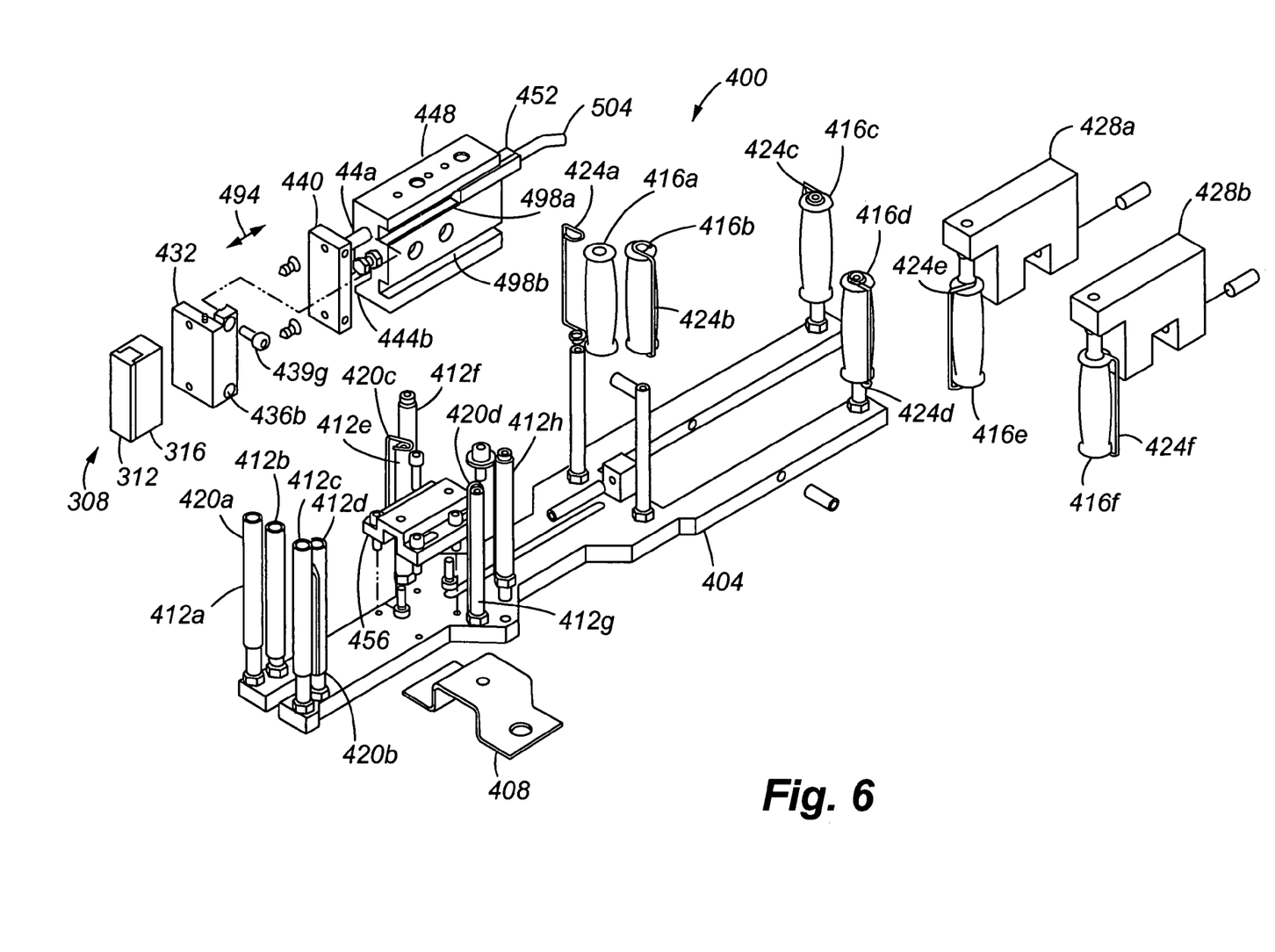
FIG. 6 is a disassembled view of the edge wiping and burnishing machine of FIG. 5.

While the contact assembly 308 of FIG. 3 is a stand-alone machine, the edge wipe process of the present invention may also be combined with a burnishing process that buffs the upper and lower disk surfaces. An example of such a machine is shown in FIGS. 4-6. The machine 400 includes a base plate 404, a mounting bracket 408 (for removably engaging the underside of the base plate and a mounting surface 410), a plurality of first (rotatably mounted) tape support rollers 412*a-h*, a plurality of second (rotatably mounted) tape support rollers 416*a-f*, a plurality of first spring tape retainer members 420*a-d*, a plurality of second spring tape retainer members 424*a-f*, the contact assembly 308, rear support members 428*a,b*, a contact assembly support member 432 and guide members 436*a,b*, a contact assembly bearing member 440 rigidly engaging movable pistons 444*a,b*, a cylinder casing 448, a cylinder retract position sensor 452, a cylinder casing mounting member 456, a rear plate 460, front rollers 464*a,b*, lateral tape guides 470*a,b*, side rollers 474*a-d*, a vertical support member 478, first tape rollers 482 *a,b*, second tape rollers 486*a,b*, and tape 490. As can be seen from FIGS. 6-7, the tape 490 is held in position and guided by the combined efforts of the adjacent pairs first tape support rollers 412*a-h*, the second tape support rollers 416*a-f*, and the first and second spring tape retainer members 420*a-d* and 424*a-f*. The contact assembly 308, contact assembly support member 432, guide members 436*a,b*, and contact assembly bearing member 440 are displaced laterally in the direction 494 shown in and out of contact with the disk 300. The guide members 436*a,b* are received by and displaced along guide channels 498*a,b* in the cylinder case 448. When the cylinders 444 are in the retract position, the upper guide member 436*a* is in contact with the sensor 452 and a fully retracted signal is transmitted along conductor 504 to a controller.

Figure 7:
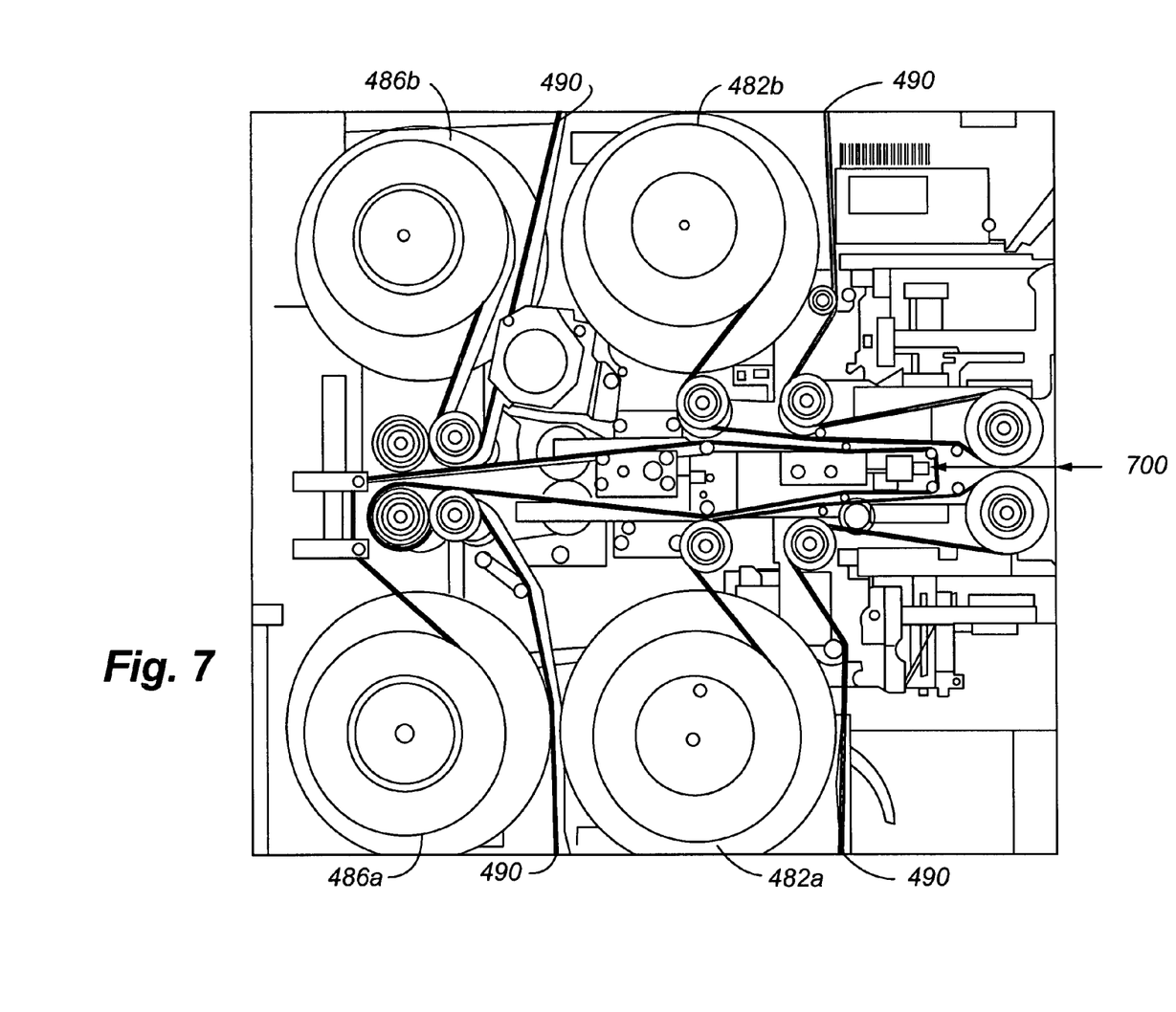
FIG. 7 is a plan view of the edge wiping and burnishing machine of FIG. 5 in operation.
Figure 8A:
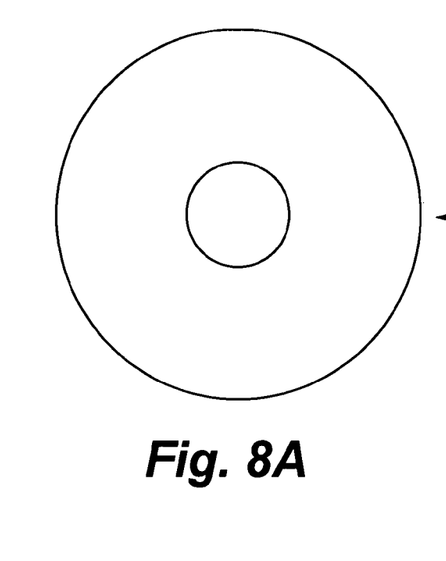
FIG. 8A depicts the reflected intensity and surface film thickness for a disk manufactured by a first process according to the present invention.
Figure 8B:
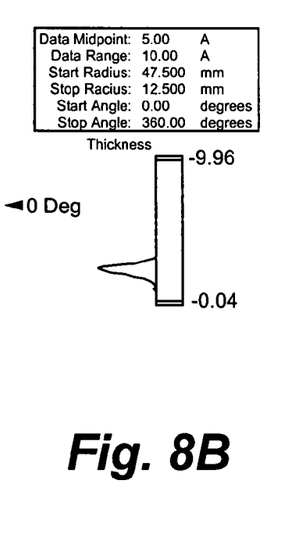
FIG. 8B shows, for the disk of FIG. 8A, a histogram of the surface film thickness (Å)
Figures 9A, 9B:
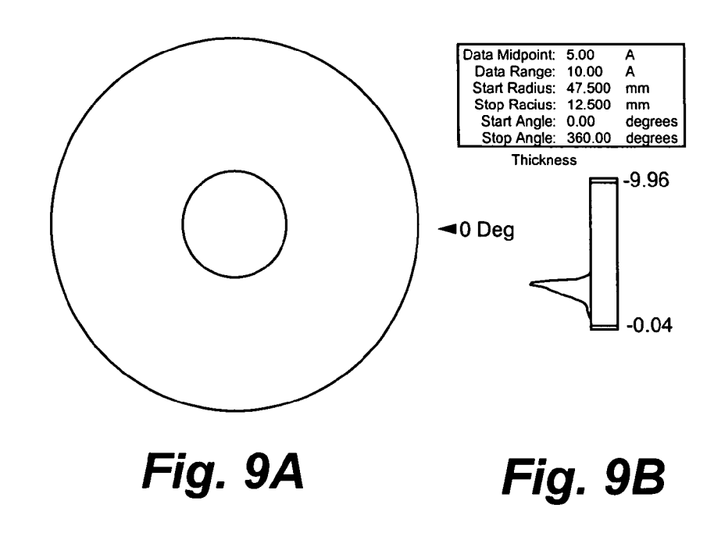
FIG. 9A depicts the reflected intensity and surface film thickness for another disk manufactured by the same process as the disk of FIG. 8A.
FIG. 9B shows, for the disk of FIG. 9A, a histogram of the surface film thickness (Å)
Figures 10A, 10B:
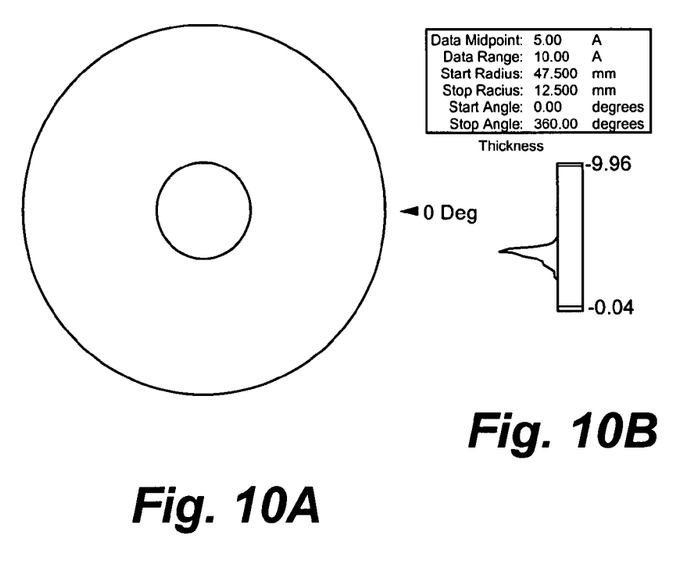
FIG. 10A depicts the reflected intensity and surface film thickness for a disk manufactured by a second process according to the present invention.
FIG. 10B shows, for the disk of FIG. 10A, a histogram of the surface film thickness (Å)
Figures 11A, 11B:
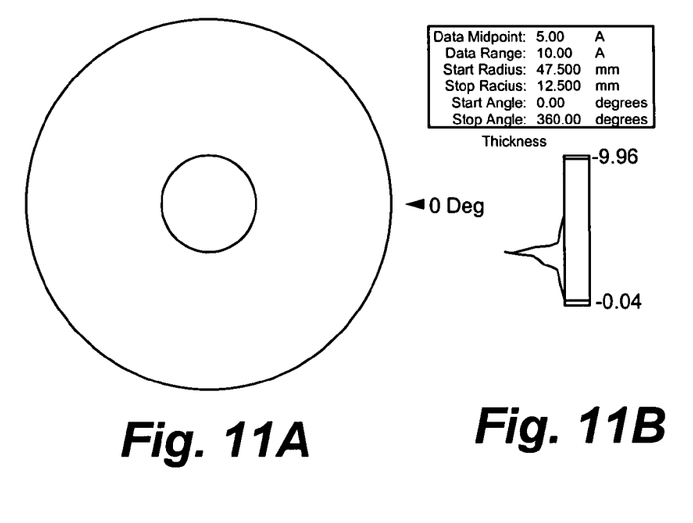
FIG. 11A depicts the reflected intensity and surface film thickness for another disk manufactured by the same process as the disk of FIG. 10A.
FIG. 11B shows, for the disk of FIG. 11A, a histogram of the surface film thickness (Å)

In operation, the disk 300 is robotically removed from a cassette (not shown), mounted on a spindle assembly (not shown) and moved into the position shown in FIG. 7. Details on this part of the operation are provided in copending U.S. application Ser. No. 10/434,547, filed May 9, 2003, entitled "Method for Simultaneous Two-Disk Texturing", which is incorporated herein by reference in its entirety. During disk positioning, the rollers 464*a,b* are displaced outwardly with respect to one another. After the disk is positioned, the rollers 464*a,b* are moved to the positions shown in FIG. 7. The disk is then rotated, the rollers rotated to cause the burnishing tape 490 to contact the opposing surfaces 460*a,b* of the disk, and the contact assembly 308 moved to the edge wipe position in which the tape 490 contact the edge 160 of the rotating disk 300. While the opposing disk surfaces 360*a,b* of the disk are being burnished with fresh tape at location 700, used tape is simultaneously redirected over the contact pad 312 to remove and redistribute at least most of the lubricant layer on the edge 160 and chamfer 124 of the disk 300. When the tape burnishing operation is completed, the contact assembly 308 retracts.

In either of the above machine configurations, the lube-removal and/or lube-redistribution process can be enhanced by dispensing a small amount of a lubricant solvent, such as ethanol, methanol, HFE™, and Vertrel™ both manufactured by 3M, and PF5060™, onto a portion of the tape 490 immediately before the tape moves to the gap between the disk edge 160 and the pad 312. This is a "wet" wipe process as opposed to the "dry" wipe process described above.

The present invention can be used for simultaneous two-disk processing of contact-merged single-side sputtered disks, such as the process described in U.S. application Ser. No. 10/434,547, or for conventional single-disk processing of double-side sputtered disks of all form factors (e.g., 95 mm, 84 mm, 70 mm, 65 mm, 48 mm, 25 mm, etc.).

EXPERIMENTAL

A number of disks were fabricated by conventional techniques and the techniques of the present invention. The disks were subjected to optical surface analyzers or OSA lube mapping to determine the thickness of the applied lubricant layer across the surfaces of the disks. The surface analyzer is a full surface laser reflectivity tool. It measures the amount of incident light reflected by the surface, point-by-point. The reflected intensity is highly sensitive to the presence of surface films, such as lubricants.

Lubricant layer thickness is determined by calibrating the percentage decrease in reflectivity relative to an unlubricated surface. Variations on the order of 1 Å are detectable by this method.

Free lubricant distribution is measured by a three-step process. First, a film image of the surface is acquired. The surface is then rinsed with a fluorinated solvent which removes the free lubricant. A second image is then acquired and subtracted from the original image. The difference image represents the free lubricant.

Figures 12A, 12B:
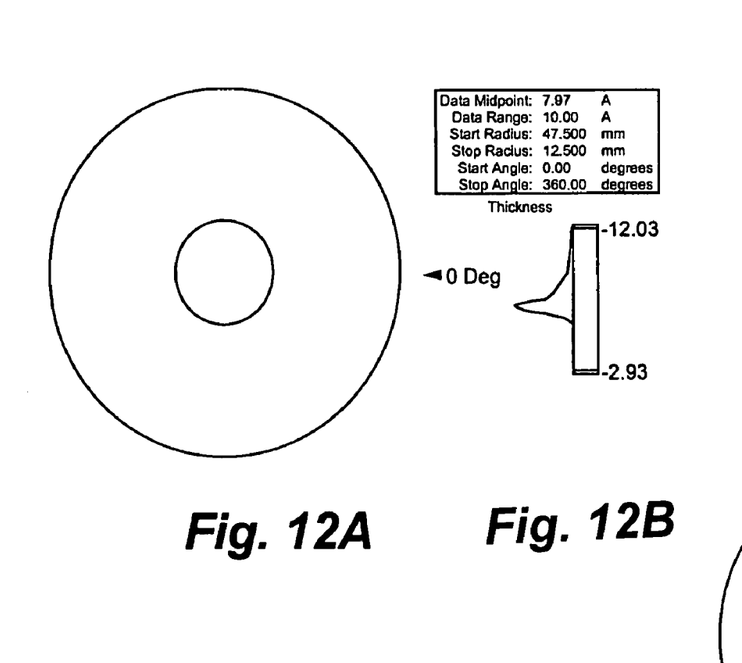
FIG. 12A depicts the reflected intensity and surface film thickness for a disk manufactured by conventional techniques.
FIG. 12B shows, for the disk of FIG. 12A, a histogram of the surface film thickness (Å)
Figure 13A:
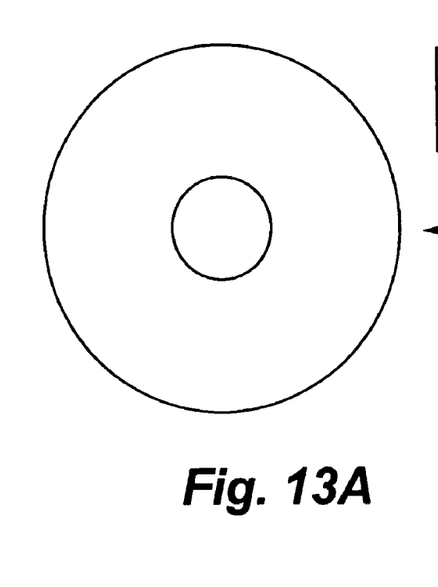
FIG. 13A depicts the reflected intensity and surface film thickness for another disk manufactured by conventional techniques.
Figure 13B:
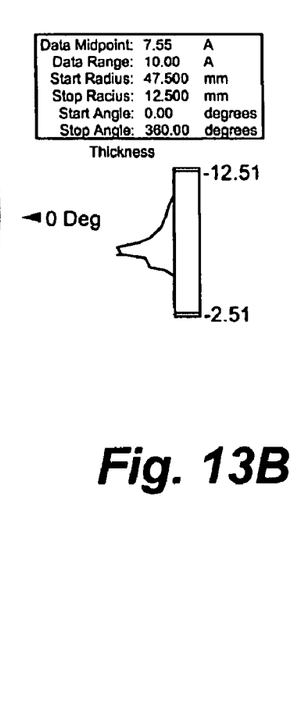
FIG. 13B shows, for the disk of FIG. 13A, a histogram of the surface film thickness (Å).

The disks were OSA scanned from a point on the inner periphery of the disk (12.5 mm) to a point on the outer periphery of the disk (47.5 mm) at a start angle of 0 degrees and an end angle of 360 degrees. The disks of FIGS. 8A, 8B, 9A, and 9B were pre-soaked with an edge wipe; the disks of FIGS. 10A, 10B, 11A, and 11B were post-soaked with an edge wipe; and the disks of FIGS. 12A, 12B, 13A, and 13B were produced conventionally without an edge wipe. The data midpoints were 5 Å and data range 10 Å for the disks of FIGS. 8A, 9A, 10A, and 11A; 7.97 and 10 Å for the disk of FIG. 12A; and 7.55 and 10 Å for the disk of FIG. 13A.

FIGS. 8A-13B show the free lubricant uniformity on the disk surface both before and after a temperature/humidity exposure. The exposure was conducted for 96 hours at 80° C. and 80% relative humidity. This exposure accelerates free lube migration and formation of the outer diameter lubricant puddle formation on disks that were not subjected to the edge wipe process (FIGS. 12A, 12B, 13A, and 13B) but not on disks that were subjected to the edge wipe process (FIGS. 8A, 8B, 9A, 9B, 10A, 10B, 11A, and 11B).

Specifically, the table below presents the results of the HDI analysis of the disks of FIGS. 8A, 8B, 9A, 9B, 10A, 10B, 11A, 11B, 12A, 12B, 13A, and 13B.

TABLE I

| Disk | | Thickness (Å) at 47.2 mm radius | Average | |
|---|---|---|---|---|
| MS3240 PreSoak (FIGS. 8A, 8B, 9A, and 9B) | disk 1A | 2.5 | 3.4 | no lube puddle |
| | disk 1B | 4.0 | | |
| | disk 2A | 3.0 | | |
| | disk 2B | 4.0 | | |
| MS3240 Post 80C 80% RH 96 Hour Soak (FIGS. 10A, 10B, 11A, and 11B) | disk 1A | 4.0 | 4.1 | no lube puddle |
| | disk 1B | 4.0 | | |
| | disk 2A | 4.5 | | |
| | disk 2B | 4.0 | | |
| Ares WW46 Post 80C 80% RH 96 Hour Soak (FIGS. 12A, 12B, 13A, and 13B | disk 1A | 18.0 | 17.5 | on lube puddle |
| | disk 1B | 18.0 | | |
| | disk 2A | 18.0 | | |
| | disk 2b | 17.0 | | |
| | disk 3a | 18.0 | | |
| | disk 3b | 17.0 | | |

Further experiments were conducted to demonstrate the difference in bottom edge lubricant layer thickness with and without disk edge wiping. These results are shown in Tables II and III below:

TABLE II

Comparison of Edge Wipe with No Wipe Process

| | Bottom Edge Thickness (Å) |
|---|---|
| No Wipe | 56 |
| | 71 |
| | 60 |
| | 63 |
| Wipe | 12 |
| | 11 |
| | 12 |
| | 11 |

| | Edge Thickness (Å) |
|---|---|
| No Wipe | 56 |
| | 66 |
| | 49 |
| | 52 |
| | 71 |
| | 69 |
| | 60 |

TABLE II-continued

Comparison of Edge Wipe with No Wipe Process

| Wipe (TB08) | 15 |
|---|---|
| Wipe (TB28) | 16 |
| | 7 |
| | 13 |

TABLE III

Lube Thickness vs. 90 Degree Bottom Thickness

| | Bottom Edge Thickness (Å) | 90 Degrees Thickness (Å) |
|---|---|---|
| Calypso w/Wipe | 22 | 9 |
| | | 11 |
| Grizzly w/Wipe | 14 | 9 |
| | | 9 |

A number of variations and modifications of the invention can be used. It would be possible to provide for some features of the invention without providing others.

For example in one alternative embodiment, the principles of the present invention may be applied to articles other than disks to effect material removal and/or redistribution from the edge of the article. In particular, the present invention may be used to effect simultaneous removal and/or redistribution of material from both the sides and edge of such articles.

In another embodiment, the present invention is used to perform an edge wipe on the edge around the inner disk diameter. As will be appreciated, the center hole of the disk is typically chamfered to prevent chipping of the disk when the hub assembly is clamped to the disk. As in the case of the outer disk edge and chamfer, the inner disk edge and chamfer can become a location for lubricant reservoirs to form. By way of example, manufacturers refer to several break points on the disk where lubricant reservoirs can form. The break points are known to be the top disk edge, the top edge of the disk center hole, the bottom edge of the disk center hole, and the bottom edge of the disk, as well as the ID Mandrel points. Over time and as noted above, the various lubricant reservoirs can migrate to the data zone and/or landing zone of the disk. The edge wipe on the inner edge can be effective in removing and/or redistributing the lubricant in the reservoir. The wiping techniques used would be similar to those discussed above with reference to the outer diameter edge wipe.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for manufacturing a magnetic disk, comprising
   (a) forming a layer of a lubricant material on a magnetic storage medium, the layer of lubricant material being located at least on an edge of the medium, wherein the medium is a disk; and
   (b) removing at least some of the lubricant material from the edge of the medium, wherein the removing step comprises the sub-steps:
      (b1) positioning a lubricant removal material between a contact assembly and the edge of the medium;
      (b2) the contact assembly applying a force to the edge of the medium, whereby the lubricant removal material is forcibly contacted with the medium edge;
      (b3) rotating the medium during sub-step (b2); and
      (b4) moving the lubricant removal material in a direction substantially orthogonal to an upper and/or lower surface of the medium during sub-step (b2).

2. The method of claim 1, wherein the layer of lubricant material is located on at least one of an upper and lower surface of the medium and wherein, before step (b), a thickness of the layer on the edge is at least about 25 Angstroms greater than a thickness of the layer on the at least one of an upper and lower surface and wherein, after step (b), the edge thickness of the layer varies no more than about 10 Angstroms.

3. The method of claim 1, wherein, in step (b), at least most of the lubricant material is removed from the edge of the medium.

4. The method of claim 1, wherein the contact assembly comprises a contact pad having a hardness of from about 20 to about 50 durometer, wherein the force exerted on the medium edge provides a pressure ranging from about 5 to about 100 psi, and wherein the medium is rotating in step (b3) at a rate of from about 500 to about 5,000 rpm.

5. The method of claim 1, wherein the removing step comprises the further substep:
   (b4) contacting a solvent with the lubricant material on the edge of the medium during step (b2).

6. The method of claim 1, wherein the contact assembly comprises a deformable contact pad and wherein the pad comprises at least one of rubber, a nitrile polymer, and polyurethane.

7. The method of claim 1, wherein the layer of lubricant material is located on at least one of an upper and lower surface of the medium and further comprising:
   simultaneously with step (b), removing at least a portion of the lubricant material from the at least one of the upper and lower medium surface.

8. The method of claim 7, wherein a common length of lubricant removal material is used to remove the lubricant material from both the edge and at least one of the upper and lower medium surface.

9. A disk manufacturing process, comprising:
   (a) providing a magnetic storage medium, the medium being a disk comprising a layer of a first material, the first material being located on an edge of the medium; and
   (b) removing at least some of the first material from the edge of the medium, wherein the removing step comprises the sub-steps:
      (b1) positioning a removal material between a contact assembly and the edge of the medium, the removal material being operable to remove the first material;
      (b2) the contact assembly applying a force to the edge of the medium, whereby the removal material is forcibly contacted with the medium edge;
      (b3) rotating the medium during sub-step (b2), wherein the contact assembly comprises a contact pad having a hardness of from about 20 to about 50 durometer, wherein the force exerted on the medium edge provides a pressure ranging from about 5 to about 100 psi, and wherein the medium is rotating in sub-step (b3) at a rate of from about 500 to about 5,000 rpm; and
      (b4) moving the removal material in a direction substantially orthogonal to an upper and/or lower surface of the medium during sub-step (b2).

10. The process of claim 9, wherein the first material is a lubricant, wherein the layer of lubricant material is located on at least one of an upper and lower surface of the medium and wherein, before step (b), a thickness of the layer on any part of the edge is at least about 25 Angstroms greater than a thickness of the layer on the at least one of an upper and lower surface and wherein, after step (b), the edge thickness of the layer varies no more than about 10 Angstroms.

11. The process of claim 9, wherein, in step (b), at least most of the first material is removed from the edge of the medium.

12. The process of claim 9, wherein the removing step comprises the further substep:
   (b4) contacting a solvent with the first material on the edge of the medium during step (b2), wherein the solvent is a solvent for the first material.

13. The process of claim 9, wherein the contact assembly comprises a deformable contact pad and wherein the pad comprises at least one of rubber, a nitrile polymer, and polyurethane.

14. The process of claim 9, wherein the layer of first material is located on at least one of an upper and lower surface of the medium and further comprising:
   simultaneously with step (b), removing at least a portion of the first material from the at least one of the upper and lower medium surface.

15. The process of claim 14, wherein a common length of removal material is used to remove the first material from both the edge and at least one of the upper and lower medium surface.

16. A manufacturing process, comprising:
(a) providing a planar article, the article being a disk and having an edge and opposing planar surfaces, wherein the article comprises a layer of a first material, the first material being located on the opposing planar surfaces and the edge of the article; and
(b) simultaneously removing at least some of the first material from the opposing planar surfaces and edge of the medium, wherein the simultaneously removing step comprises the sub-steps:
   (b1) positioning a removal material between a contact assembly and the edge of the article, the removal material being operable to remove the first material;
   (b2) the contact assembly applying a force to the edge of the article, whereby the removal material is forcibly contacted with the article edge;
   (b3) rotating the article during sub-step (b2);
   (b4) contacting a solvent with the first material on the edge of the article during sub-step (b2), wherein the solvent is a solvent for the first material; and
   (b5) moving the removal material in a direction substantially orthogonal to an opposing planar surface of the article during sub-step (b2).

17. The process of claim 16, wherein the planar article is disk-shaped, wherein the first material is a lubricant, wherein the layer of lubricant material is located on at least one of an upper and lower surface of the article and wherein, before step (b), a thickness of the layer on the edge is at least about 25 Angstroms greater than a thickness of the layer on the at least one of an upper and lower surface and wherein, after step (b), the edge thickness of the layer varies no more than about 10 Angstroms.

18. The process of claim 16, wherein, in step (b), at least most of the first material is removed from the edge of the article.

19. The process of claim 16, wherein the contact assembly comprises a contact pad having a hardness of from about 20 to about 50 durometer, wherein the force exerted on the article edge provides a pressure ranging from about 5 to about 100 psi, and wherein the article is rotating in step (b3) at a rate of from about 500 to about 5,000 rpm.

20. The process of claim 16, wherein the contact assembly comprises a deformable contact pad and wherein the pad comprises at least one of rubber, a nitrile polymer, and polyurethane.

21. The process of claim 16, wherein a common length of removal material is used to remove the first material from both the edge and at least one of the opposing surfaces.

22. A method for manufacturing a magnetic disk, comprising
(a) forming a layer of a lubricant material on a magnetic storage medium, the layer of lubricant material being located at least on an edge of the medium, wherein the medium is a disk; and
(b) removing at least some of the lubricant material from the edge of the medium, wherein the removing step comprises the sub-steps:
   (b1) positioning a lubricant removal material between a contact assembly and the edge of the medium;
   (b2) the contact assembly applying a force to the edge of the medium, whereby the lubricant removal material is forcibly contacted with the medium edge;
   (b3) rotating the medium during sub-step (b2), wherein the contact assembly comprises a contact pad having a hardness of from about 20 to about 50 durometer, wherein the force exerted on the medium edge provides a pressure ranging from about 5 to about 100 psi, and wherein the medium is rotating in step (b3) at a rate of from about 500 to about 5,000 rpm; and
   (b4) moving the removal material in a direction substantially orthogonal to an upper and/or lower surface of the medium during sub-step (b2).

23. A method for manufacturing a magnetic disk, comprising
(a) forming a layer of a lubricant material on a magnetic storage medium, the layer of lubricant material being located at least on an edge of the medium, wherein the medium is a disk; and
(b) removing at least some of the lubricant material from the edge of the medium, wherein the removing step (b) comprises the sub-steps:
   (b1) positioning a lubricant removal material between a contact assembly and the edge of the medium;
   (b2) the contact assembly applying a force to the edge of the medium, whereby the lubricant removal material is forcibly contacted with the medium edge;
   (b3) rotating the medium during sub-step (b2);
   (b4) contacting a solvent with the lubricant material on the edge of the medium during sub-step (b2); and
   (b5) moving the removal material in a direction substantially orthogonal to an upper and/or lower surface of the medium during sub-step (b2).

24. A method for manufacturing a magnetic disk, comprising
(a) forming a layer of a lubricant material on a magnetic storage medium, the layer of lubricant material being located at least on an edge of the medium, wherein the medium is a disk; and
(b) removing at least some of the lubricant material from the edge of the medium, wherein the removing step (b) comprises the sub-steps:
   (b1) positioning a lubricant removal material between a contact assembly and the edge of the medium;
   (b2) applying, by the contact assembly, a force to the edge of the medium, whereby the lubricant removal material is forcibly contacted with the medium edge;
   (b3) rotating the medium during sub-step (b2), wherein the contact assembly comprises a deformable contact pad and wherein the pad comprises at least one of rubber, a nitrile polymer, and polyurethane; and
   (b4) moving the removal material in a direction substantially orthogonal to an upper and/or lower surface of the medium during sub-step (b2).

25. A method for manufacturing a magnetic disk, comprising
(a) forming a layer of a lubricant material on a magnetic storage medium, the layer of lubricant material being located at least on an edge of the medium;
(b) removing at least some of the lubricant material from the edge of the medium by moving a removal material in a direction substantially orthogonal to an upper and/or lower surface of the medium, wherein the layer of lubricant material is located on at least one of the upper and lower surface of the medium;
(c) simultaneously with step (b), removing at least a portion of the lubricant material from the at least one of the upper and lower medium surface, wherein a common length of lubricant removal material is used to remove the lubricant material from both the edge and at least one of the upper and lower medium surface.

26. A disk manufacturing process, comprising:
(a) providing a magnetic storage medium, the medium being a disk comprising a layer of a first material, the first material being located on an edge of the medium and comprising a lubricant material; and
(b) removing at least some of the first material from the edge of the medium, wherein the removing step comprises the sub-steps:
  (b1) positioning a removal material between a contact assembly and the edge of the medium, the removal material being operable to remove the first material;
  (b2) the contact assembly applying a force to the edge of the medium, whereby the removal material is forcibly contacted with the medium edge;
  (b3) rotating the medium during sub-step (b2); and
  (b4) moving the removal material in a direction substantially orthogonal to an upper and/or lower surface of the medium during step (b2).

27. A disk manufacturing process, comprising:
(a) providing a magnetic storage medium, the medium being a disk comprising a layer of a first material, the first material being located on an edge of the medium, the first material comprising a lubricant material; and
(b) removing at least some of the first material from the edge of the medium, wherein the removing step comprises the sub-steps:
  (b1) positioning a removal material between a contact assembly and the edge of the medium, the removal material being operable to remove the first material;
  (b2) the contact assembly applying a force to the edge of the medium, whereby the removal material is forcibly contacted with the medium edge;
  (b3) rotating the medium during sub-step (b2);
  (b4) contacting a solvent with the first material on the edge of the medium during step (b2), wherein the solvent is a solvent for the first material, and
  (b5) moving the removal material in a direction substantially orthogonal to an upper and/or lower surface of the medium during sub-step (b2).

28. A disk manufacturing process, comprising:
(a) providing a magnetic storage medium, the medium being a disk comprising a layer of a first material, the first material being located on an edge of the medium, the first material comprising a lubricant material; and
(b) removing at least some of the first material from the edge of the medium, wherein the removing step comprises the sub-steps:
  (b1) positioning a removal material between a contact assembly and the edge of the medium, the removal material being operable to remove the first material;
  (b2) the contact assembly applying a force to the edge of the medium, whereby the removal material is forcibly contacted with the medium edge; and
  (b3) rotating the medium during sub-step (b2), wherein the contact assembly comprises a deformable contact pad and wherein the pad comprises at least one of rubber, a nitrile polymer, and polyurethane; and
  (b4) moving the removal material in a direction substantially orthogonal to an upper and/or lower surface of the medium during sub-step (b2).

29. A disk manufacturing process, comprising:
(a) providing a magnetic storage medium, the medium comprising a layer of a first material, the first material being located on an edge of the medium, the first material comprising a lubricant;
(b) removing at least some of the first material from the edge of the medium by moving a removal material in a direction substantially orthogonal to an upper and/or lower surface of the medium, wherein the layer of first material is located on at least one of the upper and lower surface of the medium; and
(c) simultaneously with step (b), removing at least a portion of the first material from the at least one of the upper and lower medium surface, wherein a common length of removal material is used to remove the first material from both the edge and at least one of the upper and lower medium surface.

30. A manufacturing process, comprising:
(a) providing a planar article, the article being a disk and having an edge and opposing planar surfaces, wherein the article comprises a layer of a first material, the first material being located on the opposing planar surfaces and the edge of the article, the planar article being a magnetic storage medium, and the first material comprising a lubricant; and
(b) simultaneously removing at least some of the first material from the opposing planar surfaces and edge of the medium, wherein the simultaneously removing step comprises the sub-steps:
  (b1) positioning a removal material between a contact assembly and the edge of the article, the removal material being operable to remove the first material;
  (b2) the contact assembly applying a force to the edge of the article, whereby the removal material is forcibly contacted with the article edge;
  (b3) rotating the article during sub-step (b2); and
  (b4) moving the removal material in a direction substantially orthogonal to an upper and/or lower surface of the article during sub-step (b2).

31. A manufacturing process, comprising:
(a) providing a planar article, the article being a disk and having an edge and opposing planar surfaces, wherein the article comprises a layer of a first material, the first material being located on the opposing planar surfaces and the edge of the article, the planar article being a magnetic storage medium, and the first material comprising a lubricant; and
(b) simultaneously removing at least some of the first material from the opposing planar surfaces and edge of the medium, wherein the simultaneously removing step (b) comprises the sub-steps:
  (b1) positioning a removal material between a contact assembly and the edge of the article, the removal material being operable to remove the first material;
  (b2) the contact assembly applying a force to the edge of the article and moving a removal material in a direction substantially orthogonal to an opposing planar surface of the article, whereby the removal material is forcibly contacted with the article edge; and
  (b3) rotating the article during sub-step (b2), wherein the contact assembly comprises a contact pad having a hardness of from about 20 to about 50 durometer, wherein the force exerted on the article edge provides a pressure ranging from about 5 to about 100 psi, and wherein the article is rotating in step (b3) at a rate of from about 500 to about 5,000 rpm.

32. A manufacturing process, comprising:
(a) providing a planar article, the article being a disk and having an edge and opposing planar surfaces, wherein the article comprises a layer of a first material, the first material being located on the opposing planar surfaces and the edge of the article, the planar article being a magnetic storage medium, and the first material comprising a lubricant; and (b) simultaneously removing at least some of the first material from the opposing planar surfaces and edge of the medium, wherein the simultaneously removing step (b) comprises the sub-steps:
- (b1) positioning a removal material between a contact assembly and the edge of the article, the removal material being operable to remove the first material; and
- (b2) the contact assembly applying a force to the edge of the article and moving a removal material in a direction substantially orthogonal to an opposing planar surface of the article, whereby the removal material is forcibly contacted with the article edge, wherein the contact assembly comprises a deformable contact pad and wherein the pad comprises at least one of rubber, a nitrile polymer, and polyurethane.

33. A manufacturing process, comprising:
(a) providing a planar article, the article having an edge and opposing planar surfaces, wherein the article comprises a layer of a first material, the first material being located on the opposing planar surfaces and the edge of the article, the planar article being a magnetic storage medium, and the first material comprising a lubricant; and
(b) simultaneously removing at least some of the first material from the opposing planar surfaces and edge of the medium by moving a removal material in a direction substantially orthogonal to an opposing planar surface of the article, wherein a common length of removal material is used to remove the first material from both the edge and at least one of the opposing surfaces.

34. The process of claim 33, wherein the planar article is disk-shaped, wherein the first material is a lubricant, wherein the layer of lubricant material is located on at least one of an upper and lower surface of the article and wherein, before step (b), a thickness of the layer on the edge is at least about 25 Angstroms greater than a thickness of the layer on the at least one of an upper and lower surface and wherein, after step (b), the edge thickness of the layer varies no more than about 10 Angstroms.

35. The process of claim 33, wherein, in step (b), at least most of the first material is removed from the edge of the article.

36. The process of claim 33, wherein the article is a disk and wherein the removing step comprises the substeps:
- (b1) positioning a removal material between a contact assembly and the edge of the article, the removal material being operable to remove the first material;
- (b2) the contact assembly applying a force to the edge of the article, whereby the removal material is forcibly contacted with the article edge; and
- (b3) rotating the article during step (b2).

* * * * *